(12) United States Patent
Grason et al.

(10) Patent No.: US 6,990,495 B1
(45) Date of Patent: Jan. 24, 2006

(54) SYSTEM AND METHOD FOR FINDING PERSONS IN A CORPORATE ENTITY

(75) Inventors: Tom Grason, Lawrenceville, GA (US); Scott Downes, Tucker, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 235 days.

(21) Appl. No.: 09/945,759

(22) Filed: Sep. 5, 2001

(51) Int. Cl.
*G06F 17/30* (2006.01)

(52) U.S. Cl. ............... 707/10; 707/3; 707/4; 707/6; 707/100; 707/104.1; 709/203; 709/223; 709/224; 709/226

(58) Field of Classification Search ............... 707/6, 707/10, 102, 104.1, 2–5, 9, 100; 709/217, 709/218, 219, 203, 227, 201, 204, 223–226; 235/462.16, 382; 340/5.65
See application file for complete search history.

(56) References Cited

U.S. PATENT DOCUMENTS

| | | | | |
|---|---|---|---|---|
| 5,341,223 A | * | 8/1994 | Shigeeda et al. | 358/440 |
| 5,555,403 A | * | 9/1996 | Cambot et al. | 707/4 |
| 5,581,594 A | * | 12/1996 | McAfee | 340/7.1 |
| 5,737,726 A | * | 4/1998 | Cameron et al. | 705/7 |
| 5,742,769 A | * | 4/1998 | Lee et al. | 709/206 |
| 5,809,266 A | * | 9/1998 | Touma et al. | 395/340 |
| 5,892,909 A | * | 4/1999 | Grasso et al. | 709/201 |
| 5,918,010 A | * | 6/1999 | Appleman et al. | 709/203 |
| 6,035,294 A | * | 3/2000 | Fish | 707/2 |
| 6,044,368 A | * | 3/2000 | Powers | 707/2 |
| 6,052,710 A | * | 4/2000 | Saliba et al. | 709/203 |
| 6,073,138 A | * | 6/2000 | de l'Etraz et al. | 707/104.1 |
| 6,076,099 A | * | 6/2000 | Chen et al. | 709/202 |
| 6,088,796 A | * | 7/2000 | Cianfrocca et al. | 713/152 |
| 6,195,651 B1 | * | 2/2001 | Handel et al. | 707/2 |
| 6,253,202 B1 | * | 6/2001 | Gilmour | 707/9 |
| 6,269,361 B1 | * | 7/2001 | Davis et al. | 707/3 |
| 6,327,628 B1 | * | 12/2001 | Anuff et al. | 709/311 |
| 6,360,257 B1 | * | 3/2002 | Rydberg et al. | 709/223 |
| 6,377,993 B1 | * | 4/2002 | Brandt et al. | 709/227 |
| 6,501,491 B1 | * | 12/2002 | Brown et al. | 715/853 |

(Continued)

OTHER PUBLICATIONS

Microsoft Press Dictionary Third Edition, 1997, p. 160, 486 and 487.*

Yeong, W., et al., "Lightweight Directory Access Protocol", RFC 1777, Mar. 1995.

(Continued)

*Primary Examiner*—Jeffrey Gaffin
*Assistant Examiner*—Jacques Veillard
(74) *Attorney, Agent, or Firm*—Myers Bigel Sibley & Sajovec

(57) ABSTRACT

A graphical user interface-based contact information system allows users to see obtain not only contact information in a quick, efficient manner, but also allows users to see organizational charts and update communication devices. The contact information system comprises a server executing the graphical user interface that a users uses to access contact information. The contact information is stored in an information database. The graphical user interface can be a web browser. By navigating through web pages displayed to the user by the web browser, the user is able to extract contact information from the information database for a particular person, display organizational charts and provide updates to communication devices. In addition, the contact information system can access Internet sites to obtain services such as providing maps and driving directions to users based on the contact information for the particular person.

34 Claims, 6 Drawing Sheets

U.S. PATENT DOCUMENTS 6,539,379 B1 * 3/2003 Vora et al. ............... 707/6
6,668,055 B2 * 12/2003 Marwell et al. ....... 379/265.13
6,754,665 B1 * 6/2004 Futagami et al. ........... 707/102
6,802,042 B2 * 10/2004 Rangan et al. ........... 715/501.1
6,819,919 B1 * 11/2004 Tanaka ................... 455/414.1
6,859,217 B2 * 2/2005 Robertson et al. .......... 715/853
6,865,404 B1 * 3/2005 Tikkala et al. .............. 455/566
6,889,213 B1 * 5/2005 Douvikas et al. ............ 705/67

OTHER PUBLICATIONS

T. Howes, et al., "MIME Content Type for Directory Information", IETF RFC 2425, Sep. 1998.
Dawson, F., et al., "VCARD MIME Directory Profile", IETF RFC 2426, Sep. 1998.
"The SLAPD and SLURPD Administrator's Guide", University of Michigan, Release 3.3, Apr. 30, 1996, pp. 1-82.

* cited by examiner

Search Results

| Name | Org. Chart | Phone Number | Email Address |
|---|---|---|---|
| Abner D. Doe | view | (410) 555-1211 | abner@baseball.com |
| John A. Doe | view | (410) 555-1234 | johndoe@whoami.com |
| Mary J. Doe | view | (410) 555-5814 | marydoe@company.com |

Advanced Search

SYSTEM AND METHOD FOR FINDING PERSONS IN A CORPORATE ENTITY

BACKGROUND

1. Field of the Invention

The present invention relates generally to corporate personnel information directories and/or databases. More specifically, the present invention relates to finding specific information about personnel related to a corporate entity in a fast, efficient, reliable and intuitive manner.

2. Background of the Invention

The ability to find contact information for individuals quickly and reliably is crucial to a healthy organization. Conventional methods for providing this information include web-based locators and address books. Users of these tools can enter information about the person they desire to contact, for example, their last and/or first names. Using this information, the tool returns contact information for the person, for example, their telephone number or email address.

Many organizations implement these tools in the form of software running on a corporate intranet. The software presents a roster of company employees. Choosing a particular name from that roster generally provides the user information regarding that person, including, for example, the person's email address and telephone number.

One problem with conventional corporate personnel information systems is that they only provide contact information. That is, they generally do not provide any indication of where a person fits into the corporate structure other than providing the person's title. While the title provides some information, it does not provide information that can be readily used to determine those persons to whom the person reports or those persons who report to the person.

Conventional contact information systems also lack the ability for one user to forward contact information from one user to another, particularly those using a different interface from the one which the first user uses to access the information. For example, it is possible for a first user to send to a second user, via email, a web page link to the web page containing a person's contact information. The second user must then, access the web page independently to get the information. This method is not intuitive for many users.

Another conventional method for transferring contact information is for the first user to cut and paste the information to send to the second user. The second user then has to access his or her email system to get the information. Again, this method is not intuitive for many users and requires the second user to have access to a computer, which is often not the case.

Another conventional method for transferring contact information is for the first user to call the second user to provide the contact information. This method requires that both the first and second users have access to a telephone, which is not always the case, especially where the second user is traveling. Moreover, it may require re-entering the contact information into a different device which can also be inconvenient.

Another problem with conventional contact information systems is that they generally do not allow users to access portions of the contact information database to update the information. This is because such access is typically limited to one or more system administrators. Consequently, to update information, a user is required to advise a system administrator of any changes. The system administrator is then responsible for updating the system.

SUMMARY OF THE INVENTION

The present invention solves the foregoing problems and deficiencies in conventional contact information systems by providing a personnel information system and method for quickly and efficiently obtaining and updating contact and other information regarding a person. The personnel information system of the present invention employs a graphical user interface (GUI) to display personnel information stored in an information database to its users. Preferably, the GUI is a web browser. Typically, a user performs a search for a particular person in an organization. Wildcards and partial names can be used to facilitate the search. Advanced searches are available for narrowing the search if desired.

The GUI executes on the user's computer coupled to the information directory through a corporate internal network. Access to Internet sites that can provide additional information to users of the present invention is accomplished by accessing the Internet. The corporate internal network is preferably insulated from external influences by the use of firewalls.

Search results are returned in a search results window or web page. The search results web page displays the names of all persons matching the search criteria. More information about any of the persons whose names appear on the search results web page can be obtained by selecting that person. The information returned by selecting a person from the search results web page typically includes the person's full name, title, telephone number, email address, pager address (if applicable) and any other information implementers of the present invention may choose to include. For example, a picture of the person can be included in block 408, if desired.

In addition to obtaining additional information about a person, the person's place in an organization's hierarchy can be displayed in the form of an organizational chart. Preferably, the organization chart is limited to one level above and one level below the person. The display preferably provides a reduced set of the information for each person shown in the organizational chart.

Emails, pages and telephone calls can be initiated from any of the screens in which a person's email address, pager address or telephone number respectively appear. Access to Internet sites provides additional information to users of the present invention. For example, driving directions to a person's address and/or a map, can be obtained by accessing an Internet site that provides driving directions and maps.

The information database is preferably populated by an organization's human resources operation. In addition, relevant information regarding contractors is provided through communications with the contractor's offices. Modifications to the information stored in the information directory is typically performed by administrators, though limited or full authority to perform such modifications can be granted to users of the present invention.

The present invention is described in greater detail in the detailed description of the invention, the appended drawings and the attached claims.

BRIEF DESCRIPTION OF THE DRAWINGS

FIG. 3 is an exemplary search results web page in accordance with the present invention.

DETAILED DESCRIPTION OF THE INVENTION

Figure 1:
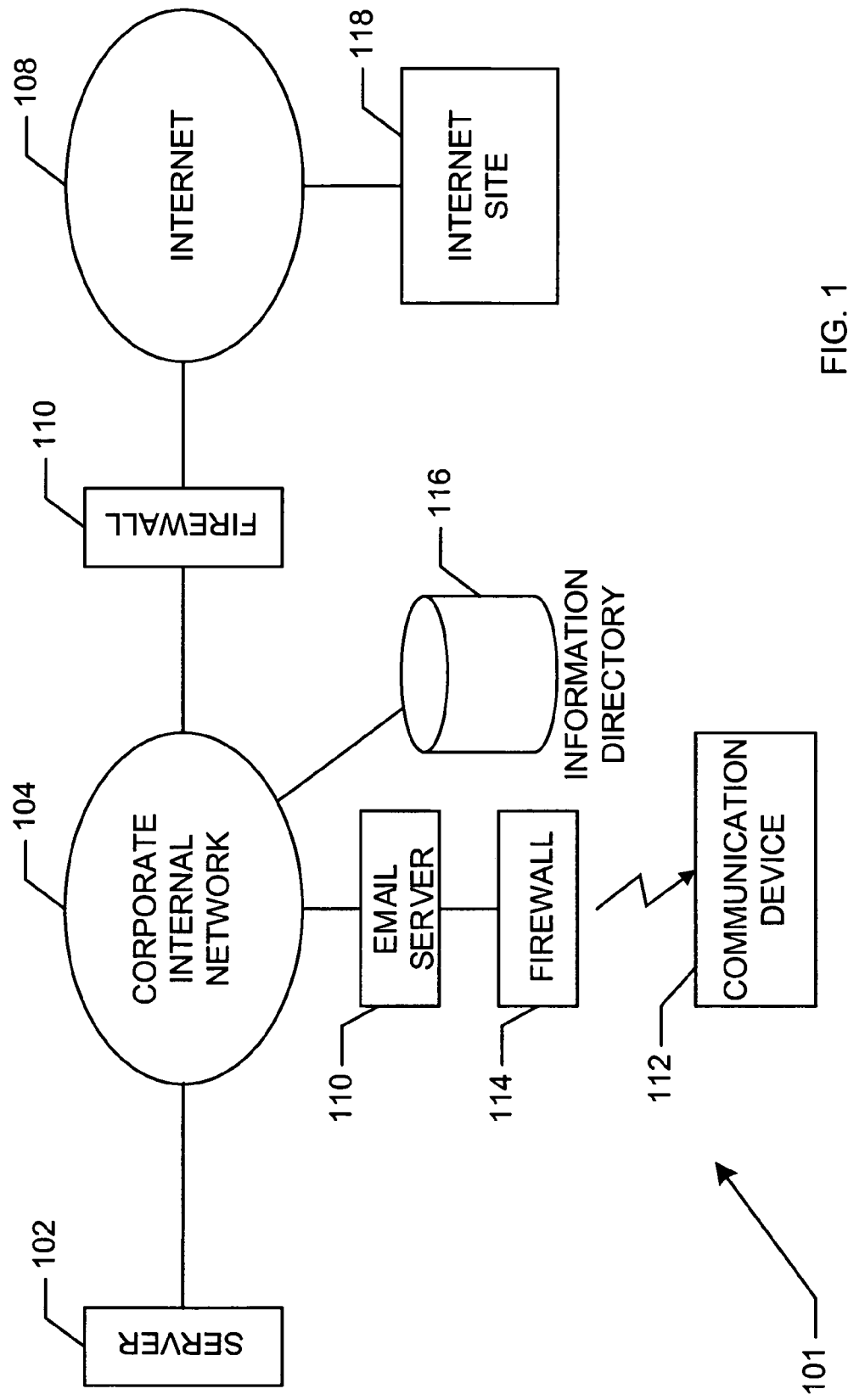
FIG. 1 is a schematic diagram of an architecture for a personnel information system 101 in accordance with the present invention.

FIG. 1 is a schematic diagram of an architecture for a personnel information system 101 in accordance with the present invention. A server 102 provides a user interface for accessing the personnel information system of the present invention. The user interface (described in further detail below) is preferably a graphical user interface (GUI).

Server 102 is coupled to a corporate internal network 104. Corporate internal network 104 is a secure network that is protected by authorization and authentication practices that are well-known to those skilled in the art. For example, corporate internal network 104 is protected from most external influences by firewalls 110 and 118. Corporate internal network is preferably only accessible by employees and other persons having a need to access corporate information.

Such information includes contact information and other information regarding individuals associated with the corporate entity, including, for example, employees, former employees, consultants and contractors. The contact information is stored in contact information records in an information database 116. Preferably, information database 116 is an information directory conforming to the lightweight directory access protocol (LDAP) format. The information can also be stored in and accessed from a database in a well-known manner. The data in information directory 116 can be accessed using well-known LDAP commands. The LDAP protocol is described in detail in Yeong, W., Howes, T., and S. Kille, "Lightweight Directory Access Protocol", RFC 1777, March 1995, which is incorporated by reference herein in its entirety.

The information stored in information directory 116 can come from any source capable of communicating such information to directory 116. For example, information directory 116 can be maintained by a human resources (HR) operation of the organization. HR maintains a master data file containing employee records, and possibly also former employee records. The employee records contain all required personnel information for each of the organization's employees (and former employees). Information directory 116 can be the master data file itself, or can be loaded, in whole or in part, from this master data file.

In addition, to employee records, information directory 116 contains information regarding consultants and contractors hired to assist the organization. The consultant and contractor information can be entered manually, or can be uploaded from external communication with personnel databases associated with companies that provide consultants or contractors to the organization.

Modifications to the information stored in information directory 116 are generally performed by authorized administrators. However, users of the present invention can modify certain fields of information directory 116. For example, users can be given limited access to modify telephone numbers, email addresses and interactive pager addresses. Users would not generally be given permission to modify information such as payroll information, office codes or home addresses. The limitations on user access for the purposes of modifying information directory 116 are implementation dependent, and some implementations can provide more access than others, including complete access to allow users to modify personnel information stored in information directory 116 as they desire.

Corporate internal network 104 is also coupled to a communication device 112 through a firewall 114. For example, communication device 112 can be an interactive pager. Preferably, communication device 112 can upload personal contact information delivered by corporate internal network 104. As described below, computer internal network 104, can upon direction from a user, send update information to communication device 112. Firewall 114 protects the corporate internal network from unauthorized and often destructive external agents.

Corporate internal network 104 is also coupled to the Internet 108 through a firewall 110. By accessing the Internet 108, the present invention can provide additional information based on the information stored in information database 116. For example, as described below, the information can be used to send a query to an Internet website 118. Internet website 118 responds to the requests with some desired information. For example, Internet website can be MapQuest. By properly formatting a URL to access MapQuest, driving directions to the address information stored in information directory 116 associated with a person can be obtained. Other uses of the information are described below.

Preferably, the interface to the present invention is a graphical user interface (GUI). The GUI of the present invention executes on server 102. Preferably, the GUI is implemented using a web technology to create web pages through which a user can navigate to obtain desired information about a person. The GUI of the present invention is described with respect to FIGS. 2–5.

Figure 2:
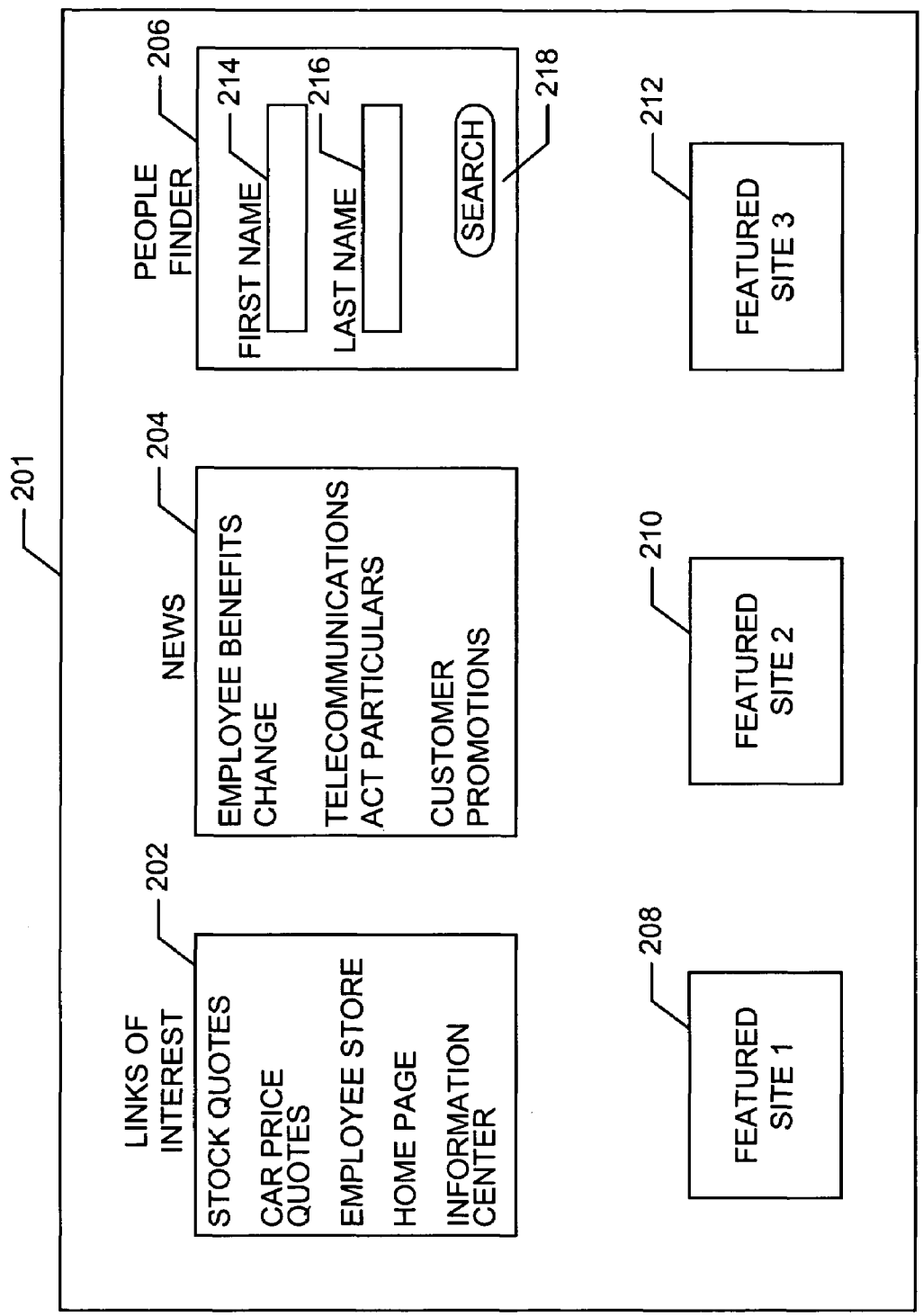
FIG. 2 is an exemplary organization home page that can be displayed to a user of the present invention.

FIG. 2 is an exemplary organization home page 201 that can be displayed to a user of the present invention. Home page 201 comprises a links of interest area 202, a news area 204, a people finder area 206 and featured sites 208, 210 and 212. Home page 201 is essentially a launching area where users obtain corporate news, information and other items of general interest.

In addition, home page 201 provides an entry point via people finder 206 into the GUI of the present invention. Thus, if a user desires information about a particular person, the user can enter the name of the person if known, using first name block 214 and/or last name block 216. After the user has entered the person of interest's first and/or last names, the user clicks on SEARCH button 218. Clicking on SEARCH button 218 causes the system of the present invention to query information directory 116 to obtain information regarding the person of interest.

The search can use wildcard characters in a manner that is well-known to those skilled in the art. In addition, the search can be based on a partial name. Thus, if a user wanted to find someone whose last name is "Johnson," the user can enter "John" or "Johns" for example. All names beginning with "John" or "Johns" will be returned to the user. The partial name search can also be based on the last part of a name or any other part of a name. The user has the option of disabling wildcard character and partial name searches or requiring exact matches.

The system returns the results of the search in a search results web page 301 having a format similar to that shown in FIG. 3. FIG. 3 is an exemplary search results web page in accordance with the present invention. For example, assume the user elected to search information directory 116 using a last name search with the search term "Doe." The system returns all records in information directory 116 for which the last name field is "Doe." In this case, there are three such records as shown in FIG. 3. In addition, each person's phone number and email address are returned. Of the information that is returned from information directory 116, the information that is actually displayed is a matter of engineering design choice. Search results web page 301 is one example of such a choice.

To obtain information to display in response to a user request, a call is made on a UNIX platform to information directory 116 to pull certain information and render it to the user in the user's GUI. Preferably, this call is made using JAVA-based JSP code. Information directory 116 preferably returns only the data required to populate any of the GUI displays of the present invention for a particular person in response to a search query. This data may be all or a portion of the records stored for each person in information directory 116. In the preferred embodiment of the present invention, for example, only a portion of the information stored for a particular person in information directory 116 is required to populate any of the GUI displays of the preferred embodiment of the present invention, and only this portion of the data is returned in response to a search request. Using only a portion of the information is advantageous in reducing network traffic and minimizing memory requirements.

The results of a search are preferably listed in some predetermined order, for example, alphabetically as shown in FIG. 3. For each "hit," search result web page 301 preferably lists the person's name, business telephone number and business email address. A user of the present invention can retrieve additional information regarding a particular individual meeting the search criteria by single or double clicking on the person's name from the list in search results web page 301. Retrieval of the information can be made more efficient if all of the required data for the person is obtained when the search results are initially returned.

In addition, a user of the present invention can send an email message to a particular individual listed on search results web page 301 by single or double clicking on the person's email address. Further, a user of the present invention can obtain a graphical display showing where a particular individual fits in the corporate hierarchy by clicking on the "*view*" button associated with that individual's name. Moreover, a user of the present invention can make a telephone call to a particular person listed on search results web page 301 provided the user's computer is set up for establishing outgoing telephone calls.

Figure 4:
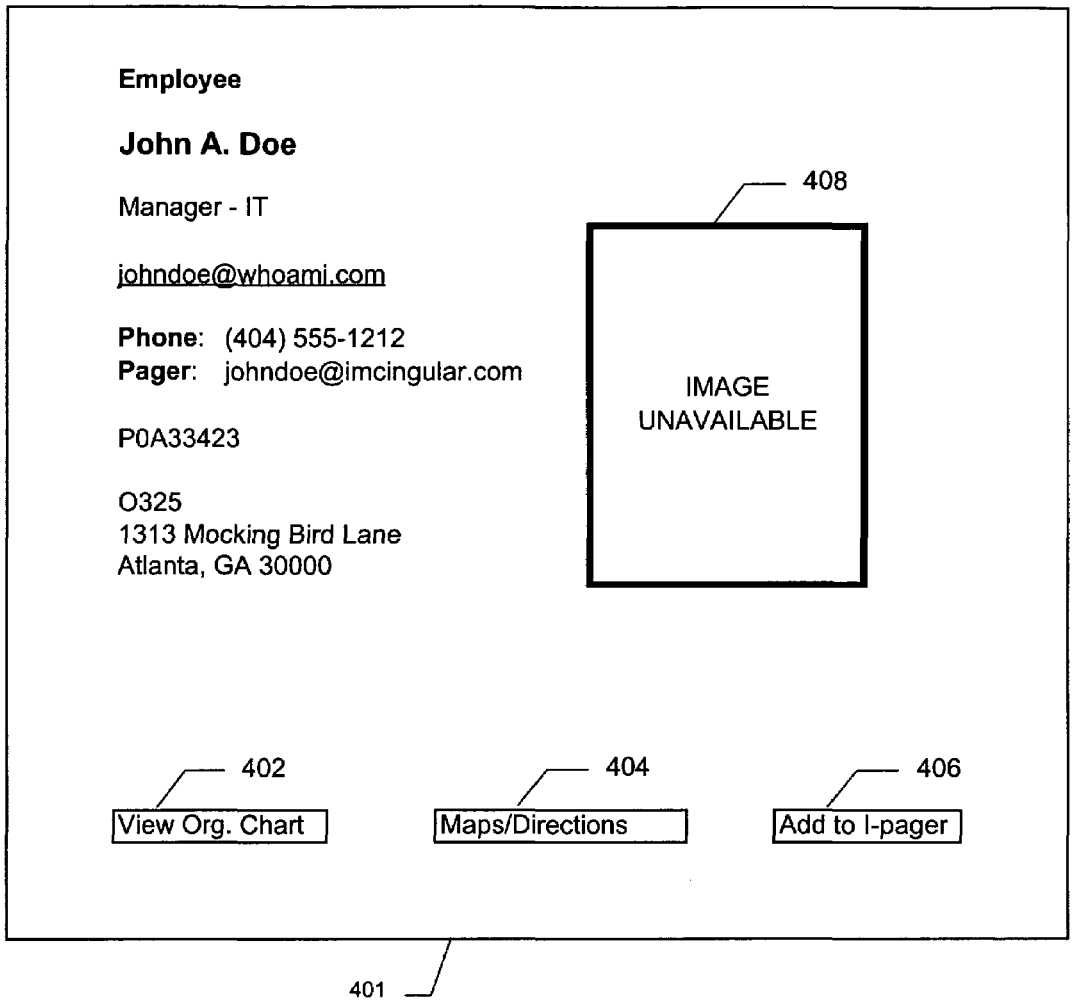
FIG. 4 is an exemplary personnel information web page in accordance with the present invention.

As described above, by clicking on a person's name, a user of the present invention can obtain more information regarding the person whose name was clicked on. In response to the user's clicking on the person's name, the GUI displays a personal information page having a format similar to web page 401 in FIG. 4. FIG. 4 is an exemplary personnel information web page in accordance with the present invention. The user is shown whatever information about a person that is on file is desired to be shown on the person's personal information page. For example, personal information page 401 displays John A. Doe's name, title, email address, telephone number, pager number/address, his organization code, office number, office address and picture if available. It would be apparent to those skilled in the art that the choice of which information to show from the information that is stored in information directory 116 is a matter of design choice.

In addition, the user has the option of viewing an organizational chart for the person. As described below, the organizational chart preferably illustrates the person's position in the hierarchy of the organization in terms of immediate supervisors and those the person immediately supervises. To see the organization view, the user selects a "View Org. Chart" button 402. The user can also obtain maps and driving directions to the person's business or home address by selecting a "Maps/Directions" button 404. Moreover, the user can add whatever information is provided to the user in a personal communication device, such an interactive pager by selecting an "Add to I-pager" button 406. This contact information updating function is described in further detail below.

When a user chooses to see an organization view, for example, by clicking on view button 402, an organization view centered around the person is shown to the user. Preferably, the organizational view is limited to the hierarchy one level above and one level below the person. Thus, what is shown are those people the person reports to as well as those people who report to the person. The organizational view can be printed in hardcopy.

Figure 5:
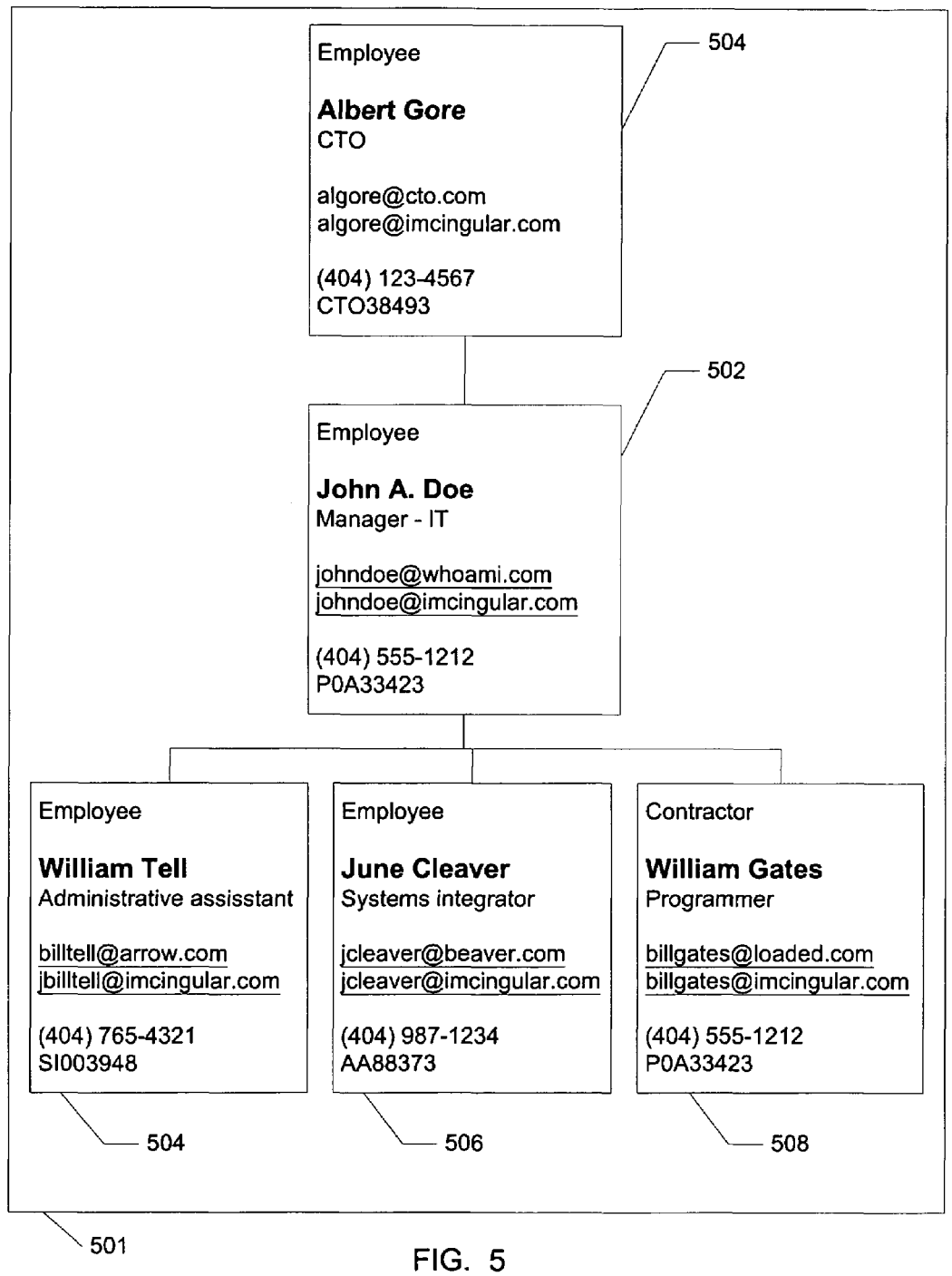
FIG. 5 is an exemplary organization chart view web page in accordance with the present invention.

An exemplary organizational view is shown in organizational chart web page 501 in FIG. 5. Organizational chart web page can be generated in response to user commands, including clicking on view button 402 of personal information page 401 or clicking on the view button corresponding to John A. Doe in search results web page 301. Organizational web page 501 is structured to place information corresponding to John A. Doe in the center in block 502. Preferably, the person that John Doe reports to is shown above John A. Doe in organizational chart web page 501. In this case, that person is Albert Gore shown in block 502. Preferably, the person or persons who report to John A. Doe are shown below John A. Doe in organization chart web page 501. More levels of the organization hierarchy can be displayed if desired. In this example, these people are William Tell, June Cleaver and William Gates, illustrated in blocks 504, 506 and 508 respectively.

Further, information about each person shown in organization chart web page 501 can be provided in the blocks associated with each person. Any personnel information maintained in information directory 116 can be displayed. For example, the blocks in organization chart web page 501 show name, title, contact information (such as email address, pager address, phone number) and organization code. What information is displayed is implementation dependent. The information is obtained from information directory 116 as described below. The view also indicates the person's relationship to the organization, for example, whether the person is an employee or contractor.

Clicking on a particular person's block in organization chart web page 501 provides an organization chart centered around that person. For example, clicking on Albert Gore's block would move Albert Gore's block to the center of organization chart web page 501 and show those people reporting to Albert Gore, and any person Albert Gore reports to.

The hierarchical relationships required to generate organizational views are stored in information directory 116. For example, for each person, information directory 116 can have a record containing a pointer (or other record identification) to the record of the people that report to that person, as well as a pointer (or other record identification) of the people that person reports to.

A "Maps/Directions" button 404 allows a user of the present invention to obtain directions to the person's location. For example, clicking on button 404 causes the system to format John A. Doe's address information into a call to a mapping system such as the well-known MapQuest service. The mapping system provides a map of the area surrounding that address as well as driving directions, if desired. The driving directions option may require the user to enter his own location as a starting location prior to formatting the URL. Because, the mapping system in the preferred embodiment of the present invention is not part of the corporation's intranet, the URL is sent through firewall 110 to the Internet 108 to internet site 118. For this example, internet site 118 is the MapQuest site. Formatting the URL appropriately as to implement the function of the present invention described above is within the knowledge of those having skill in the art.

It would be apparent that other information websites on the Internet can be accessed in a similar manner. For example, a weather button can be added that a user pushed to obtain weather information for his or her location. The user clicks the weather button. In response, the system formats the user's address information, or a portion thereof (for example, the user's zip code), into a call to a weather information site. The weather information site receives the user's request and returns the desired weather information for display on the user's computer.

A user of the present invention can also send updates of contact information to a communication device she owns or uses or one that is owned or used by others. The updates can be re-formatted to be received by any communication device including for example, interactive pagers and cellular telephones. For example, suppose an employee of the corporation is traveling. The traveling employee has an interactive pager, such as the Blackberry device available from Research in Motion (RIM) of Waterloo, Ontario Canada. Further, suppose the traveling employee requires contact information for a particular person, in this case John A. Doe. The traveling employee can use one of the conventional methods to obtain the contact information described above. However, as described above, there are significant limitations with those methods. Taking advantage of the present invention however, the traveling employee can telephone someone at the corporation having access to the locator functions of the present invention, for example his or her secretary, and have the secretary upload the required contact information to the traveling employee's interactive pager.

To accomplish the necessary upload of contact information, the secretary uses the present invention to locate John A. Doe's contact information. Searching using the present invention is described in detail above. Upon locating John A. Doe's records, the system display the information to the secretary as shown in FIG. 4. The secretary then selects "Add to I-pager" button 406. Selecting button 406 causes the system to prompt the user (the secretary in this case) for the address of the traveling employee's interactive pager. Alternatively, the system prompts for the name of the person who owns the interactive pager (the traveling employee's name). Given the name of the person, the system performs a table lookup to determine the corresponding interactive pager address.

The system also formats the contact information associated with John A. Doe into a format compatible with the destination device, in this case the traveling employees interactive pager. The system then sends the re-formatted contact information to the interactive pager. Preferably, this is sent as an email which is received by the interactive pager as a message with an attachment containing the contact information. For example, the VCARD standard for formatting contact information can be used to send the information. The VCARD standard is defined in IETF RFC 2425, "MIME Content Type for Directory Information and IETF RFC 2426, "VCARD MIME Directory Profile." Alternatively, RIM's proprietary standard can be used to send the message when communicating with a RIM device.

When the traveling employee receives the message containing the contact information, he or she opens the message and saves the attachments containing the contact information. The contact information is now resident and usable by the interactive pager. Thus, the traveling employee can send an email or page to John A. Doe using the interactive pager itself, or get John A. Doe's telephone number from interactive pager storage.

Figure 6:
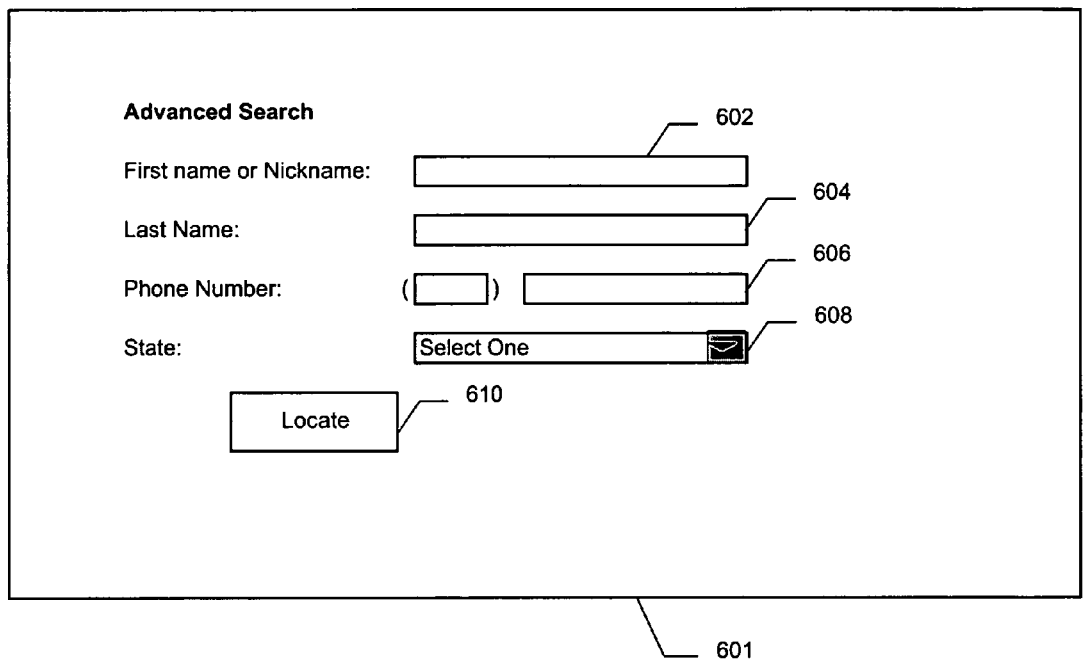
FIG. 6 is an exemplary advanced search page in accordance with the present invention.

A user can also perform an advanced search. An advanced search allows the user to more specifically define search parameters that he or she desires to search on. FIG. 6 is an exemplary advanced search page 601. Advanced search page contains a first name field 602 in which the user can input a desired person's first name or some portion thereof, a last name field 604, a phone number field 606 in which a user can input any portion of a phone number and a state pull-down menu 606, which a user uses to select the state in which to look for the person. Advanced search page 601 provides a user with more options for searching. For example, a user can chose to find all persons in the directory who have a particular area code or are in a particular state or have a particular first name from a particular state. After choosing the search criteria, the user clicks on LOCATE button 610 to perform the search. Any records meeting the criteria are presented to the user in a search results web page as described above.

Preferably, advanced search page 601 provides a consistency check for the information entered. For example, if a user enters 404 in the area code (corresponding to Atlanta, Ga.), but chose Florida as the state in which to search, advanced search page 601 would return an error. Implementation of this feature requires tables to be set up that contain the consistency check data. For example, in the foregoing example, a table of states and the corresponding area codes for those states would be created. When the users click LOCATE button 610, the system checks to see whether any consistency tables apply. If so, the information in the search request is verified against the consistency table. If the search is consistent, the system returns records satisfying the search criteria. If the search is not consistent, the system advises the user of the inconsistency, and prompts the user to modify the search criteria.

It would be apparent to those having skill in the art that any additional search criteria can be included in advanced search page 601. For example, though not shown, advanced search page 601 can be configured to have a type field to return contractors, consultants or employees that fit the remaining criteria, an address field to return persons at a particular address that fit the remaining fields or a field to search on any other information in information directory 116.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for providing contact information of persons associated with an organization to a user, comprising;
   an information database comprising contact information records for each of the individuals associated with the organization, each of the contact information records comprising contact information for a particular one of the individuals associated with the organization;
   a server coupled to the information database executing a graphical user interface which a user uses at a first location to access contact information stored in the information database;
   wherein the user uses the graphical user interface at the first location to construct a query to the information database through a corporate intranet, to which the information database responds by returning one or more of the contact information records that are responsive to the user's query,
   wherein the server displays the contact information at the first location in the form of an organization chart to the user in the graphical user interface,
   wherein the server is configured to load the returned one or more contact information records to a remote user's interactive wireless communication device at a second location different than the first location through the corporate intranet upon receiving a load request from the user at the first location, and to link the one or more contact information records to an internet site through the internet upon receiving a link request from the user.

2. The system recited in claim 1, wherein the information database is an information directory in conformance with an LDAP format.

3. The system recited in claim 1, wherein only a portion of each contact information record responsive to the query is returned in response to the query.

4. The system recited in claim 1, wherein the graphical user interface is a web browser.

5. The system recited in claim 1, further comprising a firewall through which the server is connected to an Internet to provide the user with access to an internet site that provides the user with an additional service to apply to at least a portion of the contact information returned in response to the query.

6. The system recited in claim 5, wherein the Internet site provides one or more maps using the at least a portion of the contact information.

7. The system recited in claim 5, wherein the Internet site provides driving directions using the at least a portion of the contact information.

8. The system recited in claim 1, wherein the wireless communication device can be updated by the user based on at least one of the contact information records returned in response to the query.

9. The system of claim 1, wherein the communication device is one of an interactive pager and a cellular telephone.

10. The system of claim 1, wherein the returned one or more contact information records are loaded to the wireless communication device through an email.

11. A system for providing contact information of individuals associated with an organization to a user, comprising:
    an information database comprising contact information records for each of the individuals associated with the organization, each of the contact information records comprising contact information for a particular one of the individuals associated with the organization;
    a corporate intranet to which the information database is coupled;
    a server coupled to the information database through the corporate intranet executing a graphical user interface which a user uses at a first location to access contact information;
    wherein the user uses the graphical user interface at the first location to construct a query to the information database through the corporate intranet, the response to which comprises one or more of the contact information records, the one or more contact information records being responsive to the user's query,
    wherein the server displays the contact information in the form of an organization chart to the user at the first location in the graphical user interface,
    wherein the server is configured to load the one or more of the contact information records to a remote user's interactive wireless communication device at a second location different than the first location upon receiving an load request from the user at the first location through the corporate intranet, and to link the one or more of the contact information records to an internet site through the internet upon receiving a link request from the user.

12. The system recited in claim 11, wherein the information database is an information directory in conformance with an LDAP format.

13. The system recited in claim 11, wherein only a portion of each contact information record responsive to the query is returned in response to the query.

14. The system recited in claim 11, wherein the graphical user interface is a web browser.

15. The system recited in claim 11, further comprising a firewall, coupled to the corporate intranet through which the server is connected to the Internet to provide the user with access to an Internet site that provides the user with an additional service to apply to at least a portion of the contact information returned in response to the query.

16. The system recited in claim 15, wherein the Internet site provides one or more maps using the at least a portion of the contact information.

17. The system recited in claim 15, wherein the Internet site provides driving directions using the at least a portion of the contact information.

18. The system recited in claim 15, wherein the Internet site provides weather information using the at least a portion of the contact information.

19. The system recited in claim 11, wherein the wireless communication device can be updated by the user based on at least one of the contact information records returned in response to the query.

20. The system of claim 11, wherein the one or more of the contact records are loaded to the wireless communication device through an email.

21. A method for providing contact information about one or more persons associated with an organization to a user, comprising:
    storing contact information records in an information database associated with a corporate intranet;
    creating a query at a first location;
    submitting the query from the first location to the information database through the corporate intranet;
    returning one or more contact information records responsive to the query;
    displaying data from the one or more contact information records to the user in a display at the first location;
    selecting one of the contact information records from the display at the first location;
    displaying an organizational chart at the first location using data contained in the selected record;
    upon receiving an load request from the user at the first location, loading the selected contact information record to a remote user's interactive wireless communication device at a second location different than the first location via the corporate intranet; and
    upon receiving a link request from the user at the first location, linking the selected contact information record to an internet site through the internet.

22. The method recited in claim 21, further comprising storing the contact information records in a format compatible with the LDAP format.

23. The method recited in claim 21, further comprising updating a communication device with information from the selected contact information record.

24. The method recited in claim 21, further comprising displaying a map to the user in accordance with information from the selected contact information record.

25. The method recited in claim 21, further comprising displaying driving directions to the user in accordance with information from the selected contact information record.

26. The system of claim 21, wherein the communication device is one of an interactive pager and a cellular telephone.

27. The method of claim 21, wherein the selected contact information record is loaded to the wireless communication device through an email.

28. A method for providing information about persons associated with an organization, comprising:
    accessing homepage having one or more fields for inputting query data to obtain information regarding persons associated with the organization at a first location;
    submitting, from the first location through a corporate intranet, a query to a database containing information regarding persons associated with the organization;
    receiving one or more contact information records responsive to the query;
    displaying data from the one or more contact information records to a user in a display at the first location;
    selecting one of the contact information records from the display at the first location;
    displaying an organizational chart using data contained in the selected record at the first location;
    modifying one or more of the contact information records;
    storing the one or more modified contact information records in the database;
    loading the one or more modified contact information records to a remote user's interactive wireless communication device at a second location via a corporate intranet upon receiving an load request from the user at the first location wherein the first and second locations are different; and
    linking the one or more modified contact information records to an internet site via the internet upon receiving a link request from the user at the first location.

29. The method recited in claim 28, further comprising updating a communication device with information from the selected contact information record.

30. The method recited in claim 28, further comprising selecting one of the one or more contact information records.

31. The method recited in claim 30, further comprising obtaining driving directions to an address associated with the selected contact information record electronically over the Internet.

32. The method of claim 28, wherein the interactive communication device is one of an interactive pager and a cellular telephone.

33. The method of claim 28, wherein the interactive communication device is one of an interactive pager and a cellular telephone.

34. The method of claim 28, wherein the one or more modified contact information records are loaded to the wireless communication device through an email.

* * * * *